United States Patent Office 3,554,972
Patented Jan. 12, 1971

3,554,972
THERMOPLASTIC POLYARYLSULFONE RESIN
Robert J. Cornell, Naugatuck, Conn., assignor to Uniroyal, Inc., New York, N.Y., a corporation of New Jersey
No Drawing. Filed Aug. 4, 1969, Ser. No. 847,427
Int. Cl. C08g 23/00
U.S. Cl. 260—49    6 Claims

ABSTRACT OF THE DISCLOSURE

Thermoplastic polyarylsulfone resin having recurring units of the structure

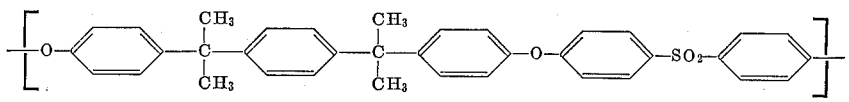

is made by reacting the dipotassium salt of alpha, alpha'-bis(4 - hydroxyphenyl) - p - diisopropylbenzene with 4,4'-dichlorodiphenyl sulfone. The resin has a high heat distortion temperature but good processability and can be injection molded. It can be blended with ABS to make a tough but readily processable gum-plastic.

---

This invention relates to a thermoplastic polyarylsulfone resin.

Thermoplastic polyarylsulfone resins are described in Netherlands patent application 6408130, Union Carbide Corp. (corresponding to U.S. application Ser. No. 295,-519), Netherlands patent application 6604730, Oct. 16, 1966, Union Carbide Corp. (corresponding to U.S. application Ser. No. 446,715), and British Patent 1,060,546, Apr. 16, 1964, Minnesota Mining and Manufacturing Co. (corresponding to U.S. application Ser. No. 273,290). Unfortunately, the conventional forms of thermoplastic polyarylsulfone resins have been difficult to process; they require high molding temperatures and in some cases cannot be injection molded. The object of the present invention is to provide a thermoplastic polyarylsulfone resin which has improved processability and can be injection molded, but at the same time has a high heat distortion temperature.

The novel thermoplastic polyarylsulfone resin of the invention is composed of recurring units of the formula

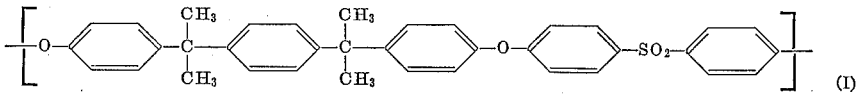 (I)

This new resin (I) may be prepared by nucleophilic displacement of chlorine from 4,4' - dichlorodiphenyl sulfone

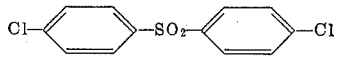 (II)

by a dialkali metal salt of alpha, alpha'-bis(4-hydroxyphenyl) p-diisopropylbenzene

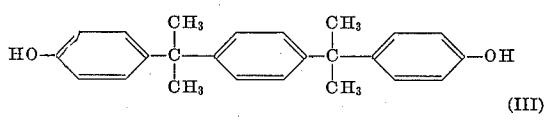 (III)

(British Patent 935,061, F. Bayer, Apr. 12, 1962, discloses III). Equimolar quantities of II and the dialkali metal salt of III are used, and the reaction is carried out in a highly polar solvent medium, suitably tetrahydrothiophene 1,1-dioxide (commonly called tetramethylene sulfone or sulfolane), under substantially anhydrous conditions, at a reaction temperature of about 180–230° C., under an inert atmosphere such as nitrogen. Usually the product has from about 18 to about 30, preferably from about 20 to about 27, of the recurring units shown.

The starting dihydric phenol (III) may be converted in sulfolane to the dialkali metal salt by reaction with an alkali metal, an alkali metal hydride, an alkali metal hydroxide or an alkali metal alkoxide. Typically the dihydric phenol (III) and aqueous alkali metal hydroxide solution are mixed in essentially stoichiometric amounts under an inert atmosphere, in sulfolane. The water from the aqueous solution plus water of neutralization is removed by distillation of water-containing azeotrope from the solvent-dipotassium salt mixture. Benzene, xylene, halogenated benzene or other inert organic azeotrope-forming liquids are suitable for this purpose. After removal of the water any remainder of the azeotrope-forming liquid is removed and the 4,4'-dichlorodiphenyl sulfone (II) is then added to form the resin (I).

The resin can be isolated from the reaction mass by filtration of the alkali metal chloride and stripping off the solvent or by precipitation in a non-solvent. Dispersion of the polymer mass in water removes the alkali metal halide and solvent. It is important to free the polymer of the salt during isolation. Drying may be accomplished by heating to 100–120° C. in vacuo for 8 to 12 hours.

The dried polyarylsulfone polymer is soluble in halogenated hydrocarbons such as chloroform, o-dichlorobenzene, chlorobenzene, etc.

Typical notched (⅛") Izod impact strength values, at 73° F., obtained on compression molded samples of various batches of the polymer, range from about 0.6 to about 1.3 foot pounds, although higher impact values are possible, particularly with injection molded samples.

The polyarylsulfone resin of the invention has a high heat distortion temperature. Although the heat distortion temperature may vary with different batches or samples of the polymer (presumably depending for example largely on the molecular weight or molecular weight distribution) it may be mentioned that the HDT, measured by ASTM method D 648–56 (1961) is substantially in excess of 300° F. at 264 pounds per square inch. Typical HDT values obtained on various preparations or samples range from 304° F. to 354° F. In preferred products the HDT is at least about 325°–330° F. Nevertheless, most unexpectedly, the polyarylsulfone polymer of the invention has much superior processability, compared with prior art polyarylsulfone polymers. Particularly surprising is the significantly lower melt viscosity of the present polymer, compared to conventional polyarylsulfone resin composed of recurring units of the formula

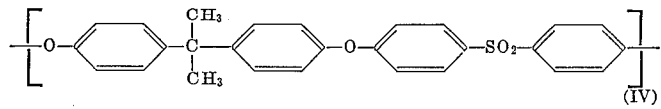 (IV)

Conventional resin of the foregoing formula may be made by reacting 4,4'-dichlorodiphenyl sulfone (II) with the dipotassium salt of bisphenol A

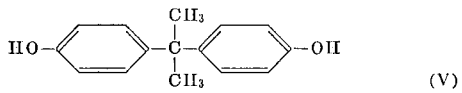

(V)

The molecular structure of the new polyarylsulfone resin of the invention therefore differs from the molecular structure of the conventional resin IV in that the present resin has one additional

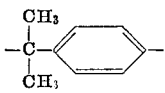

group in the recurring unit. From this change in molecular structure one could not have foreseen the significant lowering of the polymer's melt viscosity (while maintaining high heat distortion temperature) indicated by the data in the working examples below.

The superior processing qualities of the polyarylsulfone resin of the invention are evidenced in relatively low mixing torque values (melt viscosity), measured for example in the Brabender mixer as described below; typically the value, in gram-meters, is less than 2500, preferably less than 2000, more preferably 1800 or less, at 60 r.p.m., melt temperature 235° C.

The good processing qualities of the thermoplastic polymer of the invention are also reflected by the relatively low values of apparent viscosity (measured as described below), typically less than 2 dyne seconds per square centimeter, preferably less than 1.5 dyne seconds square centimeter, more preferably 1.4 dyne seconds or less, at a shear rate of 10 reciprocal seconds at 500° F.

For compression molding, the commercially available polyarylsulfone resin of structure IV requires a temperature of 550-600° F., whereas the present polymer can be compression molded at a temperature of 475° F. or less, usually 425-475° F. or less, usually 425-475° F. This is an enormous advantage in practice.

With respect to injection molding the superiority of the resin of the invention is perhaps even more remarkable. Certain prior polyarylsulfone polymers prepared in accordance with British Pat. 1,060,546 referred to above are so difficult to process (processing temperatures in the range 800-850° F.) that they cannot even be classified as injection molding resins. The conventional resin IV has a very high injection molding temperature of 650-750° F. The polyarylsulfone of the invention, in contrast, can be injection molded at 600° F. or even less, a truly outstanding advantage. The high processing temperatures of the prior art polyarylsulfones seriously handicap the utility of those polyarylsulfone polymers in fabrication of parts.

Further evidence for superior flow properties of the resin of the invention is found in the viscosity values of blends with an ABS resin which contains 22.5% acrylonitrile, 26.5% butadiene, 18% styrene and 33% alpha-methylstyrene. A blend of 50 parts of the present polyarylsulfone with 50 parts of the ABS has a Mooney viscosity (LR-450° F.) of 35, whereas a similar blend with the prior art polyarylsulfone of Formula IV has a viscosity of 50. The resin of the invention therefore makes possible a 30% reduction in the viscosity of the blended gum plastic. The blend made with the polyarylsulfone resin of the invention has a substantially lower melt viscosity but only a slightly lower heat distortion temperature. Reference may be had to copending application Ser. No. 847,070, of Ingulli et al., filed of even date herewith for more details concerning such blends.

The following examples will serve to illustrate the practice of the invention in more detail.

EXAMPLE I

This example illustrates the preparation of the polyarylsulfone resin (I) of the invention by first preparing the anhydrous dipotassium salt of alpha, alpha'-bis(4-hydroxyphenyl)-p-diisopropylbenzene (III) in sulfolane and then adding 4,4'-dichlorodiphenyl sulfone (II).

In a one liter stainless steel resin pot equipped with an oil heating bath, mechanical stirrer, gas inlet, Dean-Stark apparatus-condenser and an addition port is placed 26 g. (0.075 mole) of alpha,alpha'-bis(4-hydroxyphenyl)-p-diisopropylbenzene (III), 110 g. of sulfolane and 100 ml. of benzene, at room temperature. The reaction mass is sparged with nitrogen for 30 minutes before 20 g. (0.15 mole) of 42.3% aqueous potassium hydroxide solution is chraged. Another 10 ml. of distilled water is used to complete the transfer of the potassium hydroxide solution.

The bath temperature is increased to 130° C. and azeotropic removal of water is started. Removal of water takes approximately ten hours; before complete removal of water is accomplished the bath temperature is increased to 180° C. The benzene is then distilled and the resulting anhydrous solution of the dipotassium salt of III in sulfolane is cooled at 70° C.

21.5 g. of 4,4'-dichlorodiphenyl sulfone (0.075 mole) dissolved in 50 ml. of benzene is then added to the anhydrous potassium salt solution. The temperature of the reaction mixture is increased to 200° C., distilling off the benzene as the temperature is increased. The polymerization is run for five hours at 200° C.

The resulting viscous polymer solution is cooled, and the polymer is precipitated in methanol. The polymer is placed in water and finely divided by high speed cutting blades in a blender. The finely divided polymer is washed thoroughly with water to remove all alkali metal salt. If desired, isolation of the polymer may be done by precipitation in water directly.

The polymer is initially oven dried at 80° C. for 14 hours followed by 12 hours in vacuo at 120° C. Tough films can be compression molded at 425-475° F. The glass transition temperature is 335° F., determined by differential scanning calorimetry. The reduced viscosity of a 0.45% chloroform solution at 30° C. is 0.46. The polymer isolated amounts to 98% of theory.

Chemical analysis gives 5.8% hydrogen, 6.4% sulfur, and 75.5% carbon (theory 5.7% hydrogen, 5.7% sulfur, and 77.1% carbon).

The product has a notched (⅛") Izod impact strength of 0.85 foot-pounds at 73° F., a Rockwell (R) hardness of 124, and a heat distortion temperature of 304° F. at 264 p.s.i.

Table I compares the melt viscosity or processability of the present new polyarylsulfone thermoplastic with that of the conventional polyarylsulfone resin of Formula IV, in terms of torque values from Brabender mixing, which are directly related to melt viscosity.

The mixer employed, called a Brabender Plasticord, has a small mixing cavity containing two rotating mixing blades; the speed of the mixing blades may be varied. The mixing cavity has a jacket through which heated oil may be circulated. The polymer to be examined is added to the cavity; the rotating blades exert a torque which may be measured and depends on the viscosity of the polymer. The data in Table I were obtained on 60 gram samples with an oil bath set at 220° C. In the table, the "Melt Temperature" is the temperature of the polymer in the mixing cavity. This temperature is higher than the oil bath temperature because the mixing generates heat. The "Mixing Time" is the elapsed time measured from completion of addition of the polymer to the cavity, to a point when the mixer is stopped and the temperature of the melt is taken. It will be observed from Table I that significantly lower torque values are obtained with the resin of the invention. The prior art polyarylsulfone resin of Formula IV is a commercial material known as Bakelite P-1700 (Union Carbide Corp.) and may be made for example as described in Example 1 of U.S. Pat. 3,264,536, Robinson et al., Aug. 2, 1966.

TABLE I.—COMPARISON OF TORQUE VALUES (RESIN OF FORMULA I vs. RESIN OF FORMULA IV) OBTAINED DURING BRABENDER MIXING

|  | R.p.m. | Melt temp., °C. | Torque, gram-meters | Mixing time, min. |
|---|---|---|---|---|
| Resin of Formula IV (prior art) | 50 | 235 | 3,800 | 12 |
|  | 60 | 250 | 2,600 | 15 |
| Resin of Formula I (Invention) | 50 | 227 | 2,300 | 4 |
|  | 60 | 235 | 1,800 | 8 |
|  | 50 | 235 | 1,550 | 10 |

To determine the flow properties of the polyarylsulfones, the apparent viscosity is measured on a commercially available rheometer, such as the Instron Capillary rheometer, Model TTC, MCR. For this purpose, rods 5 inches by 3/8 inch are prepared by compression molding from the material to be tested. Each rod is heated to 500° F. in the barrel of the rheometer. A piston plunger is then pressed down on top of the heated rod, forcing the rod to flow through a 0.060 inch diameter capillary, having a length to diameter ratio of 33. The piston plunger descends at a constant speed of from 0.005 to 5 inch per minute, and the force required to extrude the rod through the capillary is measured.

Table II shows comparative data, for the resin of the invention ("Resin I," structural Formula I) vs. a prior art resin ("Resin IV", structural Formula IV), on apparent viscosity measurements, made in the foregoing manner. The superior flow of the resin of the invention is apparent from Table II. Thus, the apparent viscosity of the resin of the invention (Resin I) is lower, by a factor of more than three, than that of the prior art resin (Resin IV), between sheer rates of 1.73 to 17.3 reciprocal seconds.

TABLE II.—MELT VISCOSITY OF POLYARYLSULFONE RESIN OF STRUCTURE I vs. STRUCTURE IV AT 500° F.

|  | Shear stress dynes/cm.$^2$ | | Apparent viscosity, dyne sec./cm.$^2$ | |
|---|---|---|---|---|
|  | Resin IV | Resin I | Resin IV [a] | Resin I [a] |
| Shear rate, sec. $^{-1}$: | | | | |
| .433 | [a] 2.73 | | 6.30 | |
| .865 | [a] 4.47 | | 5.17 | |
| 1.73 | [a] 7.99 | [a] 2.28 | 4.62 | 1.32 |
| 4.33 | [b] 1.82 | [a] 5.26 | 4.19 | 1.22 |
| 8.65 | [b] 3.84 | [b] 1.20 | 4.45 | 1.39 |
| 17.3 | [b] 7.36 | [b] 2.19 | 4.25 | 1.27 |
| 43.3 | | [b] 5.26 |  | 1.21 |
| 86.5 | | [b] 9.52 |  | 1.10 |
| 173 | | [c] 1.26 |  | 0.73 |
| 433 | | [c] 2.48 |  | 0.57 |

[a] ×10$^5$.
[b] ×10$^6$.
[c] ×10$^7$.

EXAMPLE II

In the resin pot of Example I is placed 69.4 g. (0.2 m.) alpha,alpha'-bis(4-hydroxyphenyl)-p-diisopropyl benzene III, 240 g. sulfolane, and 60 ml. benzene. The reaction mass is sparged with nitrogen for 30 minutes before 52.8 g. (0.4 m.) of 42.7% KOH solution is charged, at room temperature.

The temperature is increased to 130° C. before azeotropic removal of water started. The bath temperature is increased to 170° C. before complete removal of water is accomplished. Removal of water takes approximately six hours. The reaction mixture is cooled to 70° C.

4,4'-dichlorodiphenyl sulfone (II) is added (57.4 g.; 0.2 m.) to the anhydrous dipotassium salt in sulfolane. The polymerization temperature is increased to 220° C., distilling off the benzene as the temperature increases. The polymerization is run for five hours at 220° C.

The viscous polymer solution (at 100° C.) is precipitated in a one gal. Waring Blendor containing distilled water. The polymer is agitated several times with fresh water in the blender to remove all solvent an inorganic salts. The final polymer is dried at 110° C. in vacuo for twelve hours. A total of 110 g. (97% of theory) of dried polyarylsulfone resin is isolated.

Tough films can be compression molded at 425–475° C. Reduced viscosity of a 0.45% chloroform solution at 30° C. is 0.67. The physical properties, on test samples compression molded at 425° F., are as follows. 1/8" NI., 1.02 ft. lbs. at room temperature; Heat Distortion Temperature at 264 p.s.i., 321° F.

Having thus described my invention, what I claim and desire to protect by Letters Patent is:

1. A polyarylsulfone resin composed of recurring units of the formula

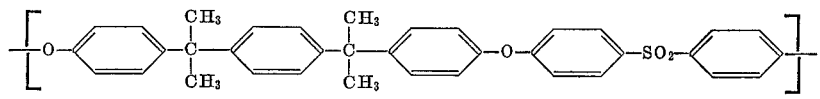

2. A resin as in claim 1 in which the number of said recurring units is from 20 to 27.

3. A resin as in claim 1 having a heat distortion temperature in excess of 300° F. at 264 pounds per square inch.

4. A resin as in claim 1 having at a temperature of 235° C. a Brabender mixing torque value of less than 2000 gram-meters at 60 revolutions per minute.

5. A resin as in claim 1 having an apparent viscosity at 500° F. of less than 1.5 dyne seconds per square centimeter at a shear rate of 10 reciprocal seconds.

6. A resin as in claim 1, compression moldable at a temperature of 475° F. and injection moldable at a temperature of 600° F.

References Cited

UNITED STATES PATENTS

| 3,264,536 | 8/1966 | Robinson et al. | 317—258 |
| 3,332,909 | 7/1967 | Farnham et al. | 260—47 |
| 3,431,230 | 3/1969 | Jackson et al. | 260—33.8 |

WILLIAM H. SHORT, Primary Examiner

L. L. LEE, Assistant Examiner

U.S. Cl. X.R.

260—33.8; 264—328